C. C. WORTHINGTON.
MOTOR GANG LAWN MOWER.
APPLICATION FILED FEB. 11, 1916.
1,330,293.
Patented Feb. 10, 1920.
2 SHEETS—SHEET 1.
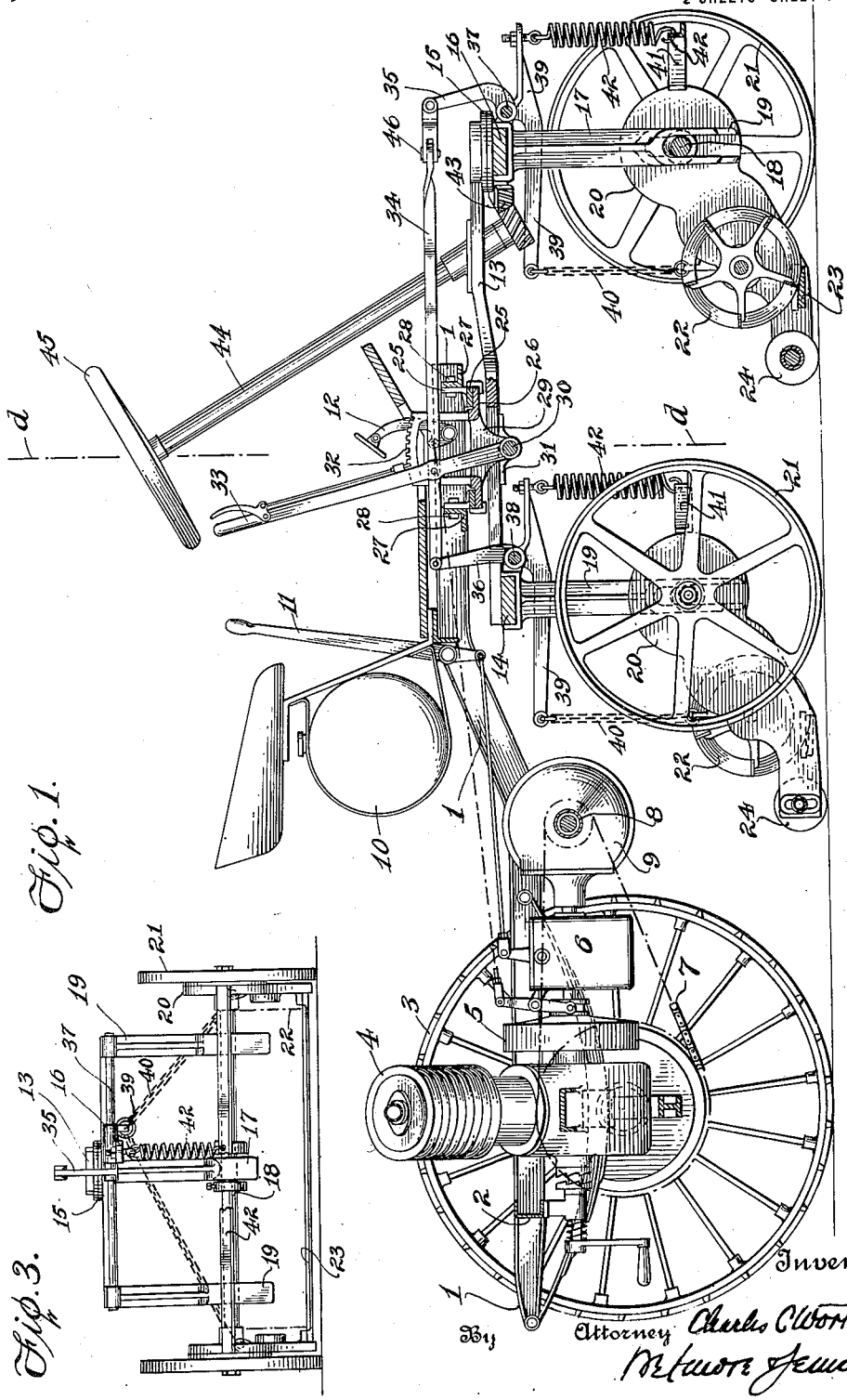

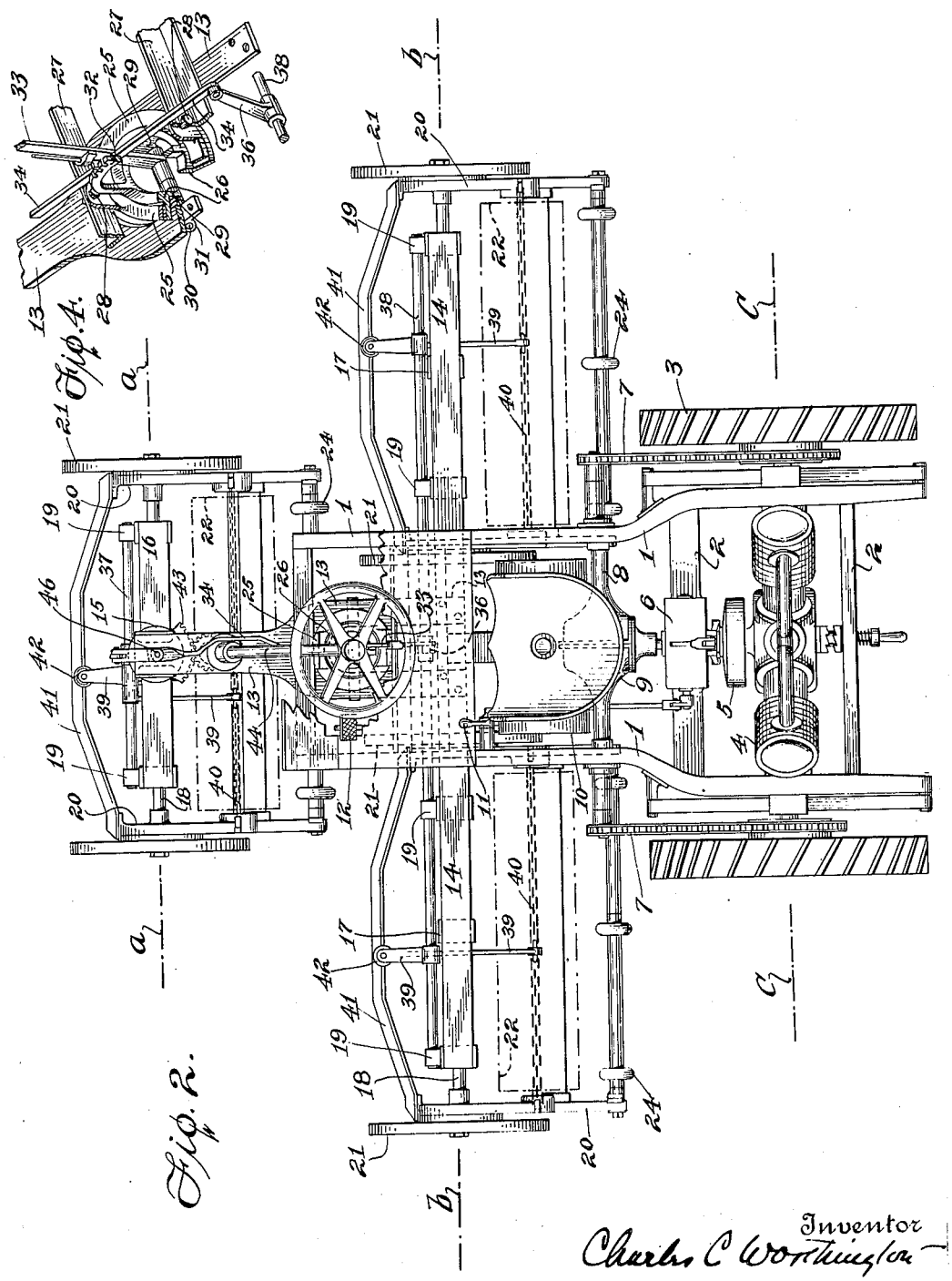

UNITED STATES PATENT OFFICE.

CHARLES C. WORTHINGTON, OF DUNNFIELD, NEW JERSEY, ASSIGNOR TO SHAWNEE MOWER COMPANY, OF NEW YORK, N. Y., A CORPORATION OF PENNSYLVANIA.

MOTOR GANG LAWN-MOWER.

1,330,293.   Specification of Letters Patent.   Patented Feb. 10, 1920.

Application filed February 11, 1916. Serial No. 77,565.

*To all whom it may concern:*

Be it known that I, CHARLES C. WORTHINGTON, a citizen of the United States, residing in Dunnfield, New Jersey, have invented the following described Improvements in Motor Gang Lawn-Mowers.

The invention is a motor-driven gang lawn mower adapted for cutting a wide swath with a uniform length of cut on undulating or irregular ground, but of relatively light weight and capable of rapid self propulsion and of being easily guided so that it may be maneuvered with the same facility as the single motor mowers now extensively in use and without injuring the lawn by the side sliding of the mowers when turning corners. The invention consists in the combinations and relative arrangements of parts hereinafter pointed out and especially in the relation of the propelling mechanism to the mower mechanism, whereby the latter carries the former and whereby the mower units and the various ground engaging wheels assume appropriate relative angles to cause them to track properly when rounding curves and whereby also the mower gang may be constituted of any desired number of mower units more than three, and in connection with such enlarged gangs one of the objects of the invention is to provide the means and principle of assemblage whereby some at least of the weight of the propelling mechanism may be distributed to and utilized by the mower units in creating the tractive grip on the ground surface which is necessary in order that they may drive their respective rotary cutters at high speeds. So far as I am aware I am the first to have contrived and produced the means whereby a gang of mower units cutting a wide swath can be driven by self-propelling mechanism carried in part at least by the gang itself and also be maneuvered as required without injury to the turf and without excessively rolling the same by concentrated wheel or roller pressure thereon, and such subject I desire to claim broadly in addition to the various other subjects hereinafter definitely pointed out in the appended claims.

In the accompanying drawings I have shown a preferred form of my invention and which will suffice to illustrate the principles involved therein. In these drawings, Figure 1 is a side elevation, partly in longitudinal section, of a three unit motor gang lawn mower:

Fig. 2 is a top plan thereof with parts broken away;

Fig. 3 is a front elevation of one of the units; and

Fig. 4 a detail.

The power plant of the mower is carried on a frame consisting of two light side-girders 1 and suitable connecting cross-members 2, the rear of the frame being supported by springs upon the axle of two driving wheels 3, and the forward end on the means which unites and spaces the various lawn mower units of the gang, as presently described. The said frame herein for convenience called the power plant frame, carries the propelling motor 4, which consists in the present case of a twin V-type gasolene engine having the usual fly-wheel 5, transmission 6 and other appurtenant parts not necessary to be shown, since the motor constitutes no part of my present invention. The wheels 3 are driven by sprocket chains 7 from the jack-shaft 8, which includes a differential gearing housed in the casing 9. The power plant frame also carries a platform and seat for the operator, the fuel tank 10 as well as the gear shift and clutch levers 11 and 12 and their connections, and such other controlling members as may be necessary or desired. The power plant and heavier parts of the propelling mechanism, including also the operator's seat, are located on the frame at erator's appropriate distances from the axle of the wheels 3, as to create a pressure upon the gang of lawn mowers not much in excess of 250 pounds when the gang is composed of three units, as in the present case. It will be evident that when a larger number of units composes the gang, a correspondingly larger proportion of the power plant weight may safely rest thereon. Combustion engine power plants of low weight per horse power are available for the purposes of my invention, and when placed substantially as indicated can be made to accomplish the effects stated with three motor units without unduly extending the overall length of the machine. It will be, of course, apparent that the weight applied to the mower units must in any event be less than that which will cause the individual wheels thereof to sink into and cut the lawn.

The treads of such wheels must be as narrow as consistent with good tractive effect, in order to avoid the rolling down of the grass in advance of the cutters, and the distribution of the weight of the power plant is therefore a consideration of great importance where the mower units individually drive their own cutters and themselves possess a considerable weight. The units preferred for the present invention cut a swath 30 inches wide and are correspondingly larger than the ordinary hand lawn mower.

The various units are held in offset echelon formation, one in front and two in rear, by a structure herein termed the gang frame and which is carried by them and interposed between them and the power plant frame. The said gang-frame consists of a longitudinal reach-piece 13 bifurcated from about its middle to its rear end, where the arms of the bifurcation are rigidly secured to a cross-piece 14 extending over and parallel with the rear row of mower units and supported upon them. The forward end of the reach-piece 13 is connected by means of a usual fifth wheel joint construction 15 with a forward cross-piece 16 disposed above and parallel with the forward unit or forward row of units and carried thereon. Each of the cross-pieces 14 and 16 is equipped with a bearing post 17 for each mower unit, such posts being forked at their lower extremities and saddled over the cross-rods 18 of the units between central collars thereon. Thereby the gang-frame is supported centrally upon the frame of each mower unit, and the latter is therefore free to tilt vertically to accommodate irregularity or undulations in the surface of the ground being mowed. In order to avoid excessive twisting strains upon the central bearing posts 17, each cross-piece 14 and 16 is further provided with a pair of guiding posts 19 disposed upon each side of the bearing post 17 of each unit near the ground wheels and engaging the cross-rods 18 by means of their forked ends, the slots in which are of sufficient depth to accommodate the maximum angle the units are likely to assume. This method of mounting the superposed framework upon the gang of mower units employs the principles of the gang lawn mower shown in my prior application, Serial No. 803,296, filed November 26th, 1913, to which reference may be had for further description.

The swaths cut by each unit overlap, producing a total swath nearly equal to the aggregate of the individual units, in the present case about 86 inches, although it is apparent, as already stated, that the invention is applicable to larger gangs of units, following the principle of weight distribution fully explained in said application.

The mower units follow the design of the familiar hand lawn mower, as also shown in that application, and will not require detailed description further than to point out that each comprises a frame consisting of side-plate gear-housings 20, a pair of ground wheels 21, a rotary cutter reel 22, a dead knife structure 23 and a wiper roller 24, the cutter being driven at high speed by the ground wheels through the trains of gearing concealed in the housings 20. In Fig. 2, for convenience the cutter reels 22 are indicated by dotted lines. It will be understood that the particular design and mode of operation of this mechanism is not a matter of consequence to this invention, and that any other desired type of cutter mechanism or mower unit may be substituted in place of that shown.

The reach-piece 13 carries the weight of the forward end of the power plant frame at a point about two-thirds of its length from the row of rear units and by means of a compound or universal pivot bearing which permits the gang-frame to assume any necessary angle with relation to the power plant frame, while maintaining a secure and rigid drive connection. The location of said connection on the gang frame is determined with reference to the centers of the several motor units, and preferably so that an equal weight will be imparted to each unit under all conditions of operation. The bearing is provided by two superposed annular members or plates marked 25 and 26 respectively, and held to each other after the manner of engagement of the plates of the well known fifth wheel joint in common use for road wagons. The uppermost plate 25 is provided with two upstanding ears 25$^a$ by which it is pivotally connected to the two cross bolsters 27 of the power plant frame and so as to be capable of rocking on the central longitudinal axis of that frame. The pivotal connection is formed by a pair of alined bolts 28 engaging said ears and cross bolsters respectively, as clearly indicated in the drawing. The lower plate member 26 is provided with two opposite depending ears 29 by which it is pivotally supported upon a cross-shaft 30 which spans the forked slot of the reach-piece 13 and is held in brackets 31 secured to the under side of said reach-piece. The gang-frame may thus rock on the transverse axis represented by the shaft 30 and it may turn on the vertical axis $d$ of the two concentric plates 25 and 26, and it may also rock relatively to the power plant frame on the longitudinal axis of the bolts 28 thereby permitting it to assume any position relative to the power plant frame which the contour of the ground may require. The lower plate 26 also carries an upstanding segment rack 32 for the latch lever 33 which controls the mower units. This lever is fulcrumed on the cross-shaft 30, and it and its segment rack 32 extend upward through an appropriate opening in the operator's platform so as to be accessible for operation by him, notwithstanding the angular position the gang frame may hold with relation to the power plant frame. The lever operates a link 34 which connects the crank-arms 35 and 36 of the rock-shafts 37 and 38 on the front and rear cross-pieces 16 and 14, respectively. These rock-shafts carry a lever arm 39 secured thereto approximately over the center of each unit, and their rear ends are connected by chains 40 with the frames of the units, so that when the latch lever 33 is thrust forwardly, the cutter mechanisms and rollers 24 of all of the units are raised from the ground and may be held in such raised positions. The forward ends of the levers 39 are connected with the forwardly projecting members 41 of the unit frames by means of the adjustable springs 42, so that the reverse operation of the latch lever 33 tends to put the springs under tension and exert a corresponding resilient downward pressure of the cutter mechanism of each unit upon the ground. This method of applying resilient pressure to the cutter mechanism and of lifting the cutter mechanism various distances from the ground, is also described and claimed in my prior application above referred to.

The machine is steered by turning the forward mower unit upon the fifth wheel-joint 15, for which purpose the cross-piece 16 is supplied with a segment rack 43 concentric to the axis of the fifth wheel and engaged and operated by the pinion on the steering column 44 which is mounted on the reach-piece 13 and inclined rearwardly so that the center of its hand-wheel 45 intersects the vertical axis $d$. Such position of the steering hand-wheel preserves it in convenient position to the operator, notwithstanding the angularity of the gang-frame, and such tilting of the wheel as takes place does not in the least interfere with the steering.

The lever operated controlling members of the mower units are accommodated to the turning of the forward mower on its fifth wheel joint by the pivotal connection 46 in the connecting link 34, the axis of such connection being normally in alinement with the axis of the fifth wheel 15. When the machine is propelled with the cutters lifted, the disalinement of the connection 46 is not so great but that the flexibility of the link 34 and the normal looseness of its connected parts will accommodate turning without straining any of the parts.

The operation of the machine will be understood without further description, and it will be observed that the arrangement is such that the axes of the various motor and mower wheels represented by the three dotted lines $a$, $b$ and $c$ in Fig. 2, will all converge at a common point whenever the machine is guided around a curve, a condition which causes the wheels to track without skidding and which will obtain, even though additional mower units should be disposed in line with the axis of the drive-wheels 3, such as might, for example, be attached to the girders 1, to further increase the width of swath cut by the machine.

While I have now described the form of my invention which is at present preferred, it is to be understood that the invention is not limited to such form and that various alterations, modifications, reversals, additions and changes in the proportions of the parts may be resorted to without departing from the invention.

I claim:

1. A motor-driven gang lawn mower comprising a power plant frame, lawn mowing mechanism comprising a plurality of rotary cutters adapted for independent accommodation to ground undulations and a plurality of cutter driving ground wheels therefor supporting one end of said frame, and a motor-driven wheel or wheels supporting the other end thereof.

2. A motor-driven gang lawn mower comprising a power plant frame, lawn mowing mechanism including a plurality of rotary cutters adapted for independent accommodation to ground undulations and a plurality of cutter driving ground wheels therefor supporting one end of said frame, means for changing the horizontal angular position of said wheels relative to the power plant frame supported thereby, and motor-driven wheels supporting the other end of said power plant frame.

3. A motor-driven gang lawn mower comprising a power plant frame, a motor impelled drive wheel supporting one end thereof, a series of mower units having cutter driving ground wheels supporting the other end arranged in front and rear rows, and means for changing the horizontal angular relation of such front and rear rows of units with respect to said power plant frame to track properly on curves with said motor impelled drive wheels.

4. A motor-driven gang lawn mower comprising a power plant frame, a series of lawn mower units having rotary cutters mounted to be self-accommodating to ground undulations and ground wheels conjointly supporting one end of said frame, and a motor-driven wheel supporting the other end.

5. A motor driven gang lawn mower comprising a power plant frame, a plurality of ground wheels conjointly supporting one end thereof, a plurality of rotary cutters in front and rear positions each individually free to tilt vertically with respect to the others in accommodation to ground undulations, a motor-driven wheel supporting the other end of said frame and steering means adapted to change the horizontal angular relation of said ground wheels to said motor-driven wheel.

6. A motor driven gang lawn mower comprising a plurality of ground wheels and a gang of rotary cutters associated therewith in front and rear positions, each individually free to tilt vertically with respect to the others, a power plant frame supported by one end on said ground wheels by means permitting it to tilt vertically and independently of each of said wheels, and a motor driven wheel supporting the other end of said power plant frame.

7. A motor-driven gang lawn mower comprising a power plant frame, a motor-driven wheel or wheels supporting one end of said frame, and a gang of lawn mower units supporting the other end of said frame, each said unit carrying a portion of the load of such end substantially equal to every other unit.

8. A motor-driven gang lawn mower comprising a power plant frame, a motor-driven wheel or wheels supporting one end thereof, a gang of mower units having cutter driving ground wheels supporting the other end, and a gang frame interposed between said units and the power plant frame and adapted to distribute the pressure from the latter in substantially equal amounts to each of said wheels.

9. A motor-driven gang lawn mower comprising a power plant frame, a gang frame supporting one end thereof, a drive wheel or wheels supporting the other, a group of lawn mower units each comprising a rotary cutter and ground wheels supporting the gang frame, and a rocker connection between each unit and said gang-frame.

10. A mowing machine of the kind described comprising a power plant frame, a drive wheel or wheels supporting one end thereof, a gang of lawn mower units united by a gang frame and supporting the other end of said power plant frame, and a flexible supporting and driving joint between said frames.

11. In a motor driven gang lawn mower, the combination with a power plant frame supported at one end by a motor driven wheel or wheels, a gang frame supporting the other end thereof and connected thereto by a pivotal joint having a horizontal axis, a plurality of ground wheels supporting said gang frame, and rotary cutters held in front and rear positions by said gang frame and by means of connections thereto which permit said cutters to be self-accommodating to ground undulations.

12. In a motor-driven gang lawn mower, a power plant frame, a gang frame connected thereto by means permitting relative angular movement of said frames about a vertical axis, a group of lawn mower units supporting said gang frame, and steering means for said gang frame having a steering wheel substantially concentric to the aforesaid vertical axis.

13. In a motor driven gang lawn mower, the combination of a drive wheel, a gang of lawn mower units disposed in front and rear rows flexibly connected to the said drive wheel, and means for directing the course of said drive wheel by causing the axis of one of said rows to assume a different horizontal angle from the axis of said drive wheel.

14. A motor driven mower comprising a power-plant frame, a gang mower composed of rows of mower units flexibly connected thereto and means for steering the said motor driven mower by varying the horizontal angle of one of the rows of the said gang.

15. A motor-driven mowing machine consisting of gang lawn mower units disposed in front and rear rows, means located between said rows connecting the units of both rows to a motor-driven wheel, said means permitting the front row of units to hold simultaneously different angular relations to the rear row of units and the axis of the motor-driven wheel.

16. A motor-driven mowing machine consisting of a gang mower disposed in two rows of mower units flexibly connected to a driving wheel or wheels of a motor, by means through which the axes of the wheels of the said units may assume horizontal angles differing relatively from those of the axis of the said motor wheel or wheels and from each other.

17. A motor-driven gang lawn mower having three rows of wheels arranged in column formation, one of said rows consisting of a driving unit, one of cutting units and one of a steering and cutting unit combined.

18. In a motor driven gang lawn mower the combination with a power plant frame supported at one end by a motor driven wheel or wheels, a gang frame supporting the other end and connected thereto by a compound pivot bearing providing for pivotal movement of said gang frame with reference to the power plant frame about a vertical and also about a horizontal axis and a plurality of ground wheels supporting the gang frame and a gang of rotary cutter mechanisms associated therewith.

19. In a motor driven gang lawn mower a power plant frame resting at one end on a motor driven wheel or wheels and at the other end upon a gang frame which is supported on a plurality of ground wheels having rotary cutters associated therewith in front and rear positions and connecting means between said frames adapted to permit pivotal motion therebetween on a horizontal, transverse axis.

20. In a motor driven gang lawn mower, a power plant frame resting at one end on a motor driven wheel or wheels, in combination with a gang frame to support the other end of said power plant frame and connecting means between said frame comprising a joint having a horizontal, longitudinal axis, a joint having a horizontal transverse axis and a joint having a vertical axis, said means being adapted to impart the propelling thrust of the driven wheel to the gang frame, and a plurality of rotary cutters having ground wheels supporting said gang frame.

21. In a motor driven mowing machine having a plurality of rotary cutters in front and rear positions, a power plant frame resting at one end on the motor driven wheel and pivotally connected at the other end to a gang frame in which said cutters are mounted, a plurality of ground wheels supporting said gang frame, an operator's seat on the power plant frame and a steering wheel and cutter-lifting means both connecting to said gang frame and both accessible to the operator in said seat.

22. A motor driven gang lawn mower having a gang of rotary cutters in front and rear positions, means for lifting said cutters from the ground, a gang frame uniting and spacing said cutters, and a power plant frame having a pivotal supporting connection on the gang frame, said lifting means comprising an operating element extending from the gang frame to the power plant frame close to the axis of said pivotal connection, whereby it is undisturbed by the movement of the gang frame about said axis.

23. A motor driven gang lawn mower having a gang of rotary cutters in front and rear overlapping position, a gang frame with respect to which said cutters are independently free to swing on horizontal axes and to tilt in the vertical planes of said axes, a power plant frame having a motor driven wheel or wheels supporting one end thereof, a pivotal supporting connection to said gang frame supporting the other end thereof, means for lifting the said cutters on their said horizontal axes from the ground comprising operating connections extending from said cutters to a common operating element occupying a position substantially coinciding with the axis of said pivotal connection, and a seat on the power plant frame from which the operator may manipulate said operating element to lift and retain the cutters in an elevated position.

24. In a motor driven gang lawn mower having a power plant frame resting by one end on a motor driven wheel or wheels and by the other upon a gang frame which includes a number of rotary cutters adapted to be lifted from the ground, a driving connection between said frames comprising superposed concentric and relatively rotary track and bearing members 25 and 26, and a cutter lifting member extending centrally through said tracks.

25. In a motor driven gang lawn mower having a power plant frame resting on a motor driven wheel or wheels at one end and at the other end upon a gang frame which contains front and rear rotary cutter units and is carried by a plurality of ground wheels, the combination of a propelling connection between said frames consisting of superposed concentrically curved tracks or plates constituting a pivotal joint between said frames having a vertical axis, one plate being connected to one of said frames by means of a joint with a horizontal axis whereby the power plant frame may assume different horizontal angles with respect to said gang frame and may tilt vertically with respect thereto.

In testimony whereof, I have signed this specification.

CHARLES C. WORTHINGTON.